United States Patent [19]

Gallagher et al.

[11] Patent Number: 5,198,473
[45] Date of Patent: Mar. 30, 1993

[54] POLYURETHANE FOAMS OF INCREASED FLAME RETARDANCY

[75] Inventors: James A. Gallagher, Grosse Ile; Duane A. Heyman, Monroe; Steven D. Gagnon, Detroit, all of Mich.

[73] Assignee: BASF Corporation

[21] Appl. No.: 803,934

[22] Filed: Dec. 9, 1991

[51] Int. Cl.$^5$ .................................................. C08J 9/00
[52] U.S. Cl. .................................. 521/99; 252/182.27; 521/129; 521/132; 521/137; 521/174; 521/914
[58] Field of Search .................... 252/182.27; 521/174, 521/132, 99, 129, 137, 914

[56] References Cited

U.S. PATENT DOCUMENTS 4,026,829  5/1977  Samura et al. ..................... 521/174
4,722,942  2/1988  Nichols et al. ..................... 521/167

Primary Examiner—Maurice J. Welsh
Assistant Examiner—Rachel Johnson
Attorney, Agent, or Firm—William G. Conger

[57] ABSTRACT

The flame retardancy of flexible polyurethane foams is increased by incorporation into the foam forming reactants of a low molecular weight, high primary hydroxyl trifunctional polyether polyol having a hydroxyl number between 300 and 500 and a primary hydroxyl content greater than 50 percent.

16 Claims, No Drawings

POLYURETHANE FOAMS OF INCREASED FLAME RETARDANCY

BACKGROUND OF THE INVENTION

1. Field of the Invention

The subject invention pertains to flexible polyurethane foams and polyol compositions suitable for their preparation. More particularly, the subject invention pertains to the preparation of polyurethane foams having higher resistance to burning through incorporation of a minor quantity of a low molecular weight, high primary hydroxyl content polyether polyol into the polyol component of the polyurethane reactants.

2. Description of the Related Art

Polyurethane flexible foams are well established commercial products having uses in seat cushions; carpet underlay; mattresses; automobile dashboards, arm rests, head rests; and like applications. An important consideration when employing polyurethane or other polymeric foams is the ability of such foams to resist ignition, or once ignited, to be self-extinguishing when the ignition heat source is removed. This is especially important when the foam is to be used within confined spaces such as homes, buildings, hospitals, airplanes, trains, and cars, for example.

Attempts to decrease the flammability of polyurethane foams have taken many paths. Halogenated flame retardants such as the halogenated alkyl phosphates and perhalogenated hydrocarbons such as decabromodiphenyloxide have been added to foam formulations. Unfortunately, such flame retardants are relatively expensive; pose environmental problems, particularly with regard to potential spills and disposal of scrap or used foam products; may alter foam properties in an unacceptable manner; and finally, provide only a limited amount of improvement with regard to flammability.

Foams filled with large amounts of nitrogenous substances have been proposed. Addition of large amounts of urea has been found to decrease the flammability of polyurethane foams, however the foam physical properties are far less than ideal. Moreover, the urea in largest part does not react with the foam-forming ingredients, and being soluble, can leach out of the foam during use, not only increasing flammability, but also rendering the foam unsuitable for many applications. Melamine has been added to polyurethane foams, and foams containing from 30 to 55 parts by weight melamine have proven to be highly flame retardant. However, melamine also reduces foam physical properties, as well as resulting in a "heavy" foam product. Furthermore, unless crushed or ground to exceptionally fine particle sizes, melamine/polyol dispersions are unstable, the melamine sedimenting out upon storage. Lower amounts of melamine, i.e. 5 weight percent, do not cause substantial loss of foam physical properties and may even decrease the compression set of flexible foams. However, this low level does not provide sufficient flame retardancy for many applications.

The use of graphite or combinations of graphite and melamine has also been proposed, however the foams and their processing share many of the same defects associated with melamine filled foams discussed previously, Other solid flame retardants such as aluminum oxide, alumina trihydrate, antimony compounds, and the like have also been proposed. Such flame retardants are expensive, and result in very "heavy" foams not having optimal physical properties.

The use of acrylonitrile/styrene graft polymer polyol dispersions has resulted in polyurethane foams with improved physical properties together with a minor decrease in flammability. Use of such dispersions, and also dispersions of polyisocyanate addition products, in conjunction with melamine has been commercialized. Again, however, at low melamine levels flame retardancy is not adequate for many applications.

It would be desirable to enable preparation of polyurethane foams displaying decreased flammability and increased self extinguishing properties without recourse to the use of solid fillers such as those described previously. It would further be desirable to further decrease the flammability of foams prepared with such fillers or decrease the amount of filler for a given level of flame retardancy. It is further desirable to achieve the above results without recourse to expensive foam raw materials and without developing problems with respect to foam formulation and/or processing.

SUMMARY OF THE INVENTION

It has now been surprisingly discovered that the use of a polyol composition containing a minor quantity of a low molecular weight polyether polyol having a high amount of primary hydroxyl groups results in polyurethane foams with greatly improved flammability properties. These polyol compositions may include conventional polyols, polymer modified polyols, and may be used advantageously in conjunction with other flame retardants.

DESCRIPTION OF THE PREFERRED EMBODIMENTS

The polyurethane foams of the subject invention are prepared by reacting a di- or polyisocyanate with one or more polyols having isocyanate-reactive hydrogens, preferably hydroxyl hydrogens, in the presence of a catalyst which promotes urethane group formation, and one or more blowing agents. The isocyanate index of the foam forming ingredients is preferably from 90 to about 110, and most preferably between 95 and 105.

In the more than fifty years since Professor Otto Bayer discovered the addition polymerization reaction leading to polyurethanes (1937), the field of polyurethane polymers has become a well established, mature technology. While the first uses of polyurethanes were in the field of fibers, rigid foams were developed in 1947 and flexible foams in 1952. In the year 1981, world production of polyurethanes exceeded 3 million metric tons.

By the term "polyurethane" is meant a polymer whose structure contains predominately urethane

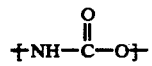

linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the *Polyurethane Handbook*, Gunter Oertel, Ed., Hanser Publishers, Munich, ©1985, in Chapter 2, pages 7–41; and in *Polyurethanes: Chemistry and Technology*, J. H. Saunders and K. C. Frisch, Interscience Publishers, New York, 1963, Chapter III, pages 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well known to those skilled in the art, and many examples may be found for example, in the *Polyurethane Handbook*, Chapter 3, §3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 90 to about 120 or 130, and more preferably from 95 to about 110. In the case of the subject invention polyurethanes, indices of from 90 to about 130, preferably from 90 to 110, and more preferably from 95 to 105 are utilized. In calculating the quantity of active hydrogens present, in general all active hydrogen containing compounds other then non-dissolving solids are taken into account. Thus the total is inclusive of polyols, chain extenders, functional plasticizers, etc.

Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkyl-phenylenediamines, mono-, di-, and trialkanolamines; tetrahydric initiators such as ethylene diamine, propylenediamine, 2,4'-, 2,2'-and, 4,4'-methylenedianiline, toluenediamine, and pentaerythritol; pentahydric initiators such as diethylenetriamine; and hexahydric and octahydric initiators such as sorbitol and sucrose. Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule. Processes for preparing such polyethers are described both in the *Polyurethane Handbook* and *Polyurethanes: Chemistry and Technology* as well as in many patents, for example U.S. Pat. Nos. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, a-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only, and not limiting. An excess of polyol should be used to ensure hydroxyl termination, although carboxyl groups are also reactive with isocyanates. Methods of preparation of such polyester polyols are given in the *Polyurethane Handbook* and in *Polyurethanes: Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluenediisocyanate (TDI) methylenediphenylenediisocyanate (MDI), and crude or polymeric MDI. Other isocyanates which may be useful include isophoronediisocyanate and tetramethylxylylidenediisocyanate. Other isocyanates may be found in the *Polyurethane handbook*, Chapter 3, §3.2 pages 62-73 and *Polyurethanes: Chemistry and Technology* Chapter II, §II, pages 17-31.

Modified isocyanates are also useful. Such isocyanates are generally prepared through the reaction of a commercial isocyanate, for example TDI or MDI, with a low molecular weight diol or amine, or alkanolamine, or by the reaction of the isocyanates with themselves. In the former case, isocyanates containing urethane, biuret, or urea linkages are prepared, while in the latter case isocyanates containing allophanate, carbodiimide, or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the *Polyurethane Handbook* in Chapter 3, §3.4, pages 90-109; and in *Polyurethanes: Chemistry and Technology*, Part II, Technology.

Polyurethane foams contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization.

The most commonly used physical blowing agents, however, are currently the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the *Polyurethane Handbook* on page 101. Current research is directed to lowering or eliminating the use of chlorofluorocarbons in polyurethane foams.

Chemical blowing agents are generally low molecular weight species which react with isocyanates to generate carbon dioxide. Water is the only practical chemical blowing agent, producing carbon dioxide in a one to one mole ratio based on water added to the foam formulation. Unfortunately, completely water-blown foams have not proven successful in many applications, and thus it is common to use water in conjunction with a physical blowing agent.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane foams generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the *Polyurethane Handbook* on pages 98-101. Commercial surfactants for these purposes are available from a number of sources, for example from Wacker Chemie, the Union Carbide corporation, and the Dow-Corning Corporation.

Processes for the preparation of polyurethane foams and the equipment used therefore are well known to those in the art, and are described, for example, in the *Polyurethane Handbook* in Chapter 4, pages 117-160 and in *Polyurethanes: Chemistry and Technology*, Part II, Technology, in Chapter VII, §§III and IV on pages 7-116 and Chapter VIII, §§III and IV on pages 201-238.

The low molecular weight, high primary hydroxyl content polyether polyols useful in minor quantity in the subject invention are trifunctional polyether polyols having hydroxyl numbers in the range of from 300 to 500 meq KOH/g polyol and having in excess of 50 percent primary hydroxyl groups. Such polyether polyols are prepared by reaction of a trifunctional initiator molecule such as glycerine, trimethylolpropane, ethanolamine diethanolamine, triethanolamine, propanol amine, dipropanol amine, and tripropanol amine with ethylene oxide and preferably also with propylene oxide. Propylene oxide, when used, is reacted first, followed with ethylene oxide. The subsequent reaction with ethylene oxide provides the necessary content of primary hydroxyl groups. Preferably at least 2 moles of ethylene oxide is reacted per mole of initiator, more preferably from 2.4 to 6 moles of ethylene oxide. The amount of low molecular weight high primary hydroxyl polyether utilized is from 1 to about 10 parts per 100 parts polyol component, preferably from 1.5 to about 5 parts.

The subject invention will now be illustrated by the following examples which should not be construed as limiting the subject matter.

EXAMPLE 1 (Comparative)

A flexible polyurethane foam was prepared by reacting toluene diisocyanate at 100 index with a polyol composition containing in parts by weight, 60 parts of a trimethylol propane initiated polyoxyalkylene polyether polyol having a hydroxyl number of 35 and a nominal functionality of 2.6 containing 84 weight percent oxypropylene and 13 weight percent oxyethylene moieties; 40 parts of a 30 weight percent 1:1 acrylonitrile/styrene graft polyol employing the trimethylolpropane initiated polyol above as the carrier polyol, and having a hydroxyl number of 24; 4 parts water as a reactive blowing agent; 1.5 parts diethanolamine; 0.7 parts NIAX C225 (Union Carbide); 0.015 parts Fomrez UL-1 (Whitco); and 1.5 parts of Dow Corning DC 5043 silicone surfactant. The foam physical properties are given in Table 1. The foam was not self-extinguishing and displayed a burn rate in the MVSS 302 test of 2.7 inches/min.

EXAMPLES 2-5

To the foam formulation above was added various quantities of low molecular weight, high primary hydroxyl polyols. The amount of isocyanate was increased to maintain the same isocyanate index. Polyol A is the reaction product of glycerine with 3 moles of propylene oxide followed by reaction with 3 moles of ethylene oxide, having a hydroxyl number of 420 and containing approximately 76.5% primary hydroxyl groups. Polyol B is the reaction product of trimethylolpropane with 3.5 moles propylene oxide followed with 2.4 moles ethylene oxide having a hydroxyl number of 380.

TABLE 1

| | Foam From Example | | | | |
|---|---|---|---|---|---|
| | 1 (Comp) | 2 | 3 | 4 | 5 |
| Polyol A | — | 3 | 5 | — | — |
| Polyol B | — | — | — | 3 | 5 |
| Density, pcf | 2.05 | 2.15 | 2.08 | 2.08 | 2.18 |
| Tensile, psi | 26.2 | 18.4 | 25.9 | 26.8 | 24.0 |
| Elongation, % | 137 | 107 | 133 | 137 | 123 |
| Comp. Load Def. | | | | | |
| Orig 25% | 0.41 | 0.43 | 0.40 | 0.44 | 0.48 |
| Orig 50% | 0.56 | 0.60 | 0.55 | 0.61 | 0.66 |
| Orig 65% | 0.86 | 0.94 | 0.86 | 0.96 | 1.04 |
| Compression Set | | | | | |
| Orig 50% | 15.5 | 15.4 | 17.5 | 17.0 | 17.8 |
| Orig 75% | 14.6 | 15.7 | 15.2 | 16.9 | 16.5 |
| Humid Aged[1] 50% | 28.8 | 29.3 | 31.6 | 30.2 | 31.7 |
| Humid Aged[2] 75% | 18.7 | 18.3 | 21.1 | 25.1 | 21.2 |
| MVSS 302 | | | | | |
| Time to Self Extinguish,[3] sec. | —[4] | 25 | 17 | 18 | 23 |
| Burn rate, in/min | 2.7 | —[5] | —[5] | —[5] | —[5] |

[1]Humid aged 6 hours at 250° F.
[2]Humid aged 3 hours at 220° F.
[3]Average of 5 or more samples
[4]Not self extinguishing
[5]Self extinguishing, no burn rate

We claim:

1. In a polyol component suitable for the preparation of a flexible polyurethane foam by reacting said polyol component with an isocyanate in the presence of a blowing agent, the improvement comprising incorporating into said polyol component from 1 to about 10 parts per 100 parts of remaining polyol components of a low molecular weight, high primary hydroxyl polyoxypropylene/polyoxyethylene copolymer polyether polyol based on a trifunctional initiator, having a hydroxyl number of from 300 to about 500 and a primary hydroxyl content of greater than 50 percent wherein said polyol component further comprises a polymer modified polyol.

2. The composition of claim 1 wherein said trifunctional initiator is selected from the group consisting of glycerine, trimethylolpropane, monoethanolamine, diethanolamine, triethanolamine, monopropanolamine, dipropanolamine, and tripropanolamine.

3. The composition of claim 1 wherein said trifunctional initiator is selected from the group consisting of glycerine and trimethylolpropane.

4. The composition of claim 1 wherein said trifunctional initiator is first reacted with propylene oxide followed by reaction with from 2 to 6 moles of ethylene oxide.

5. The composition of claim 2 wherein said trifunctional initiator is first reacted with propylene oxide followed by reaction with from 2 to 6 moles of ethylene oxide.

6. The composition of claim 3 wherein said trifunctional initiator is first reacted with propylene oxide followed by reaction with from 2 to 6 moles of ethylene oxide.

7. The composition of claim 1 wherein said polymer modified polyol is an acrylonitrile/styrene graft polyol.

8. A flame retardant polyurethane flexible foam which is the reaction product of an organic di-or polyisocyanate and a polyol component in the presence of a blowing agent, wherein the polyol component comprises from 1 to about 10 parts by weight based on the total polyol component, of a low molecular weight, high primary hydroxyl polyether polyol prepared from a trifunctional initiator, said low molecular weight, high primary hydroxyl polyether polyoxypropylene/polyoxyethylene copolymer polyol having a hydroxyl number of from 300 to 500 and a primary hydroxyl content of greater than 50 percent wherein said polyol component further comprises a polymer modified polyol.

9. The foam of claim 8 wherein said initiator is selected from the group consisting of glycerine, trimethylolpropane, monoethanolamine, diethanolamine, triethanolamine, monopropanolamine, dipropanolamine, and tripropanolamine.

10. The foam of claim 8 wherein said initiator is selected from the group consisting of trimethylolpropane and glycerine.

11. The foam of claim 8 wherein said polymer modified polyol is an acrylonitrile/styrene graft polyol.

12. The foam of claim 10 wherein said polymer modified polyol is an acrylonitrile/styrene graft polyol.

13. The foam of claim 8 further comprising an organic flame retardant selected from the group consisting of halogenated organic compounds, melamine, graphite, and mixtures thereof.

14. The foam of claim 10 further comprising an organic flame retardant selected from the group consisting of halogenated organic compounds, melamine, graphite, and mixtures thereof.

15. The foam of claim 12 further comprising an organic flame retardant selected from the group consisting of halogenated organic compounds, melamine, graphite, and mixtures thereof.

16. The foam of claim 11 further comprising an organic flame retardant selected from the group consisting of halogenated organic compounds, melamine, graphite, and mixtures thereof.

* * * * *